No. 701,336. Patented June 3, 1902.
W. A. HARPER.
FURROW OPENING AND COVERING ATTACHMENT FOR PLANTERS.
(Application filed Jan. 9, 1902.)
(No Model.)
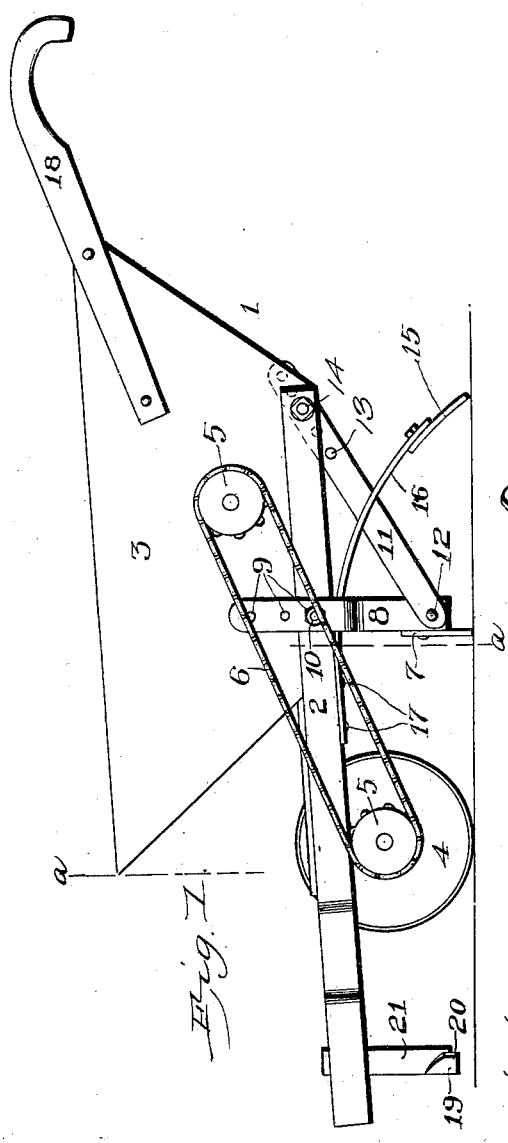
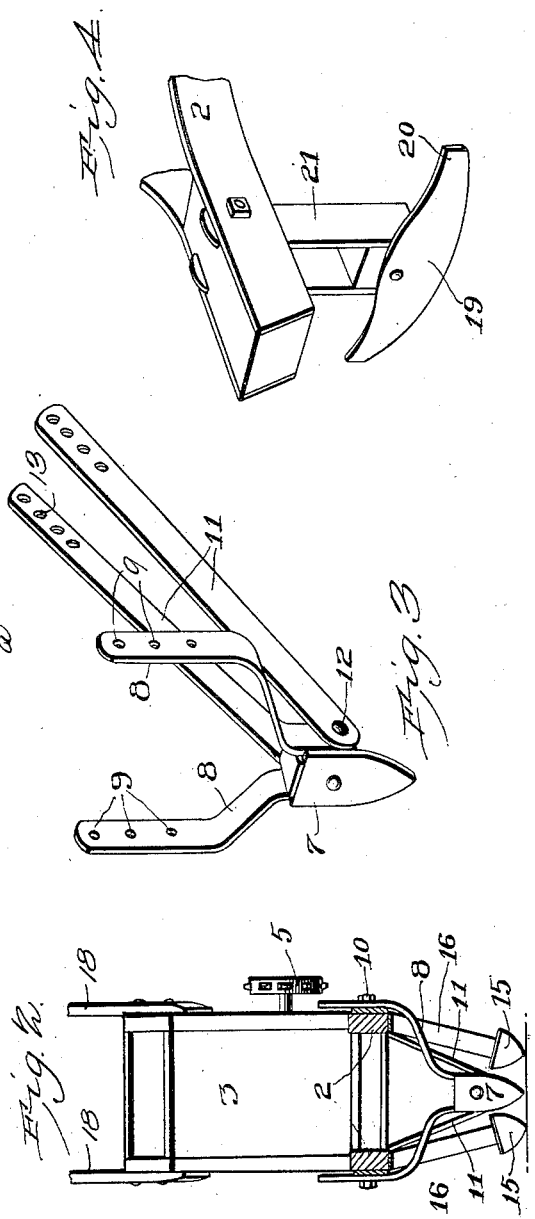
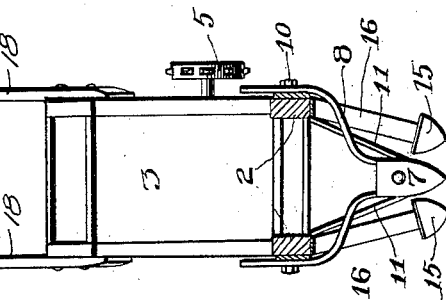
W. A. Harper, Inventor
Witnesses
by C. A. Snow & Co.
Attorneys

UNITED STATES PATENT OFFICE.

WILLIAM A. HARPER, OF GLENDALE, SOUTH CAROLINA.

FURROW OPENING AND COVERING ATTACHMENT FOR PLANTERS.

SPECIFICATION forming part of Letters Patent No. 701,336, dated June 3, 1902.

Application filed January 9, 1902. Serial No. 89,050. (No model.)

*To all whom it may concern:*

Be it known that I, WILLIAM A. HARPER, a citizen of the United States, residing at Glendale, in the county of Spartanburg and State of South Carolina, have invented a new and useful Furrow Opening and Covering Attachment for Planters, of which the following is a specification.

My invention relates to improvements in cotton-planters, particularly in furrow opening and covering attachments therefor; and it consists in the peculiar construction and combination of devices hereinafter fully set forth and claimed.

In the accompanying drawings, Figure 1 is a side elevation of a cotton-planter provided with a furrow-opening and covering attachments embodying my improvements. Fig. 2 is a transverse sectional view of the same, taken on a plane indicated by the line *a a* of Fig. 1. Fig. 3 is a detail perspective view of the furrow-opener attachment. Fig. 4 is a detail perspective view of a clearer attachment for clearing clods, stones, and other obstructions out of the way of the supporting-wheel and furrow-opener.

My improved furrow opening and covering attachments are adapted to be used in connection with any form of planter. For the purposes of this specification I have herein shown a planter 1 of a form well known to those skilled in the art to which my invention relates, the frame of the planter being indicated at 2, the hopper at 3, the supporting and power wheel at 4, sprocket-wheels at 5, and an endless chain at 6, connecting the said sprocket-wheels to transmit power from the supporting-wheel 4 to the seed-dropping mechanism, which is not here shown.

In carrying out my invention the supporting-wheel 4 is disposed at a slight distance in advance of the hopper, and the furrow-opener 7 is disposed closely behind the supporting-wheel. The furrow-opener 7, which is a point or share of any suitable form and construction, is secured between the lower ends of a pair of standard-arms 8. The upper portions of said standard-arms are spread apart laterally and are provided with adjusting-openings 9. The upper portions of the standard-arms bear against the outer sides of the frame 2 and are secured thereto by a bolt 10. The said bolt passes through the frame 2 and is disposed in appropriate adjusting-openings 9, and the latter adapt the standard-arms, and hence the furrow-opener carried thereby, to be adjusted vertically with relation to the frame 2, so that the furrow-opener may be caused to run at any desired depth in the soil to open furrows of any required depth. The bolts 10 also serve to pivot the standard-arms so that the furrow-opener may be disposed at any desired angle.

A pair of brace-bars 11 have their front ends pivotally connected to the lower ends of the standard-arms by a bolt 12. The rear ends of the said brace-bars bear against the inner sides of the side bars, which constitute the frame 2, and are provided with adjusting-openings 13. A bolt 14 is disposed in appropriate adjusting-openings 13 and passes transversely through the frame 2 and serves to secure the brace-bars 11 to the side bars of the frame, and the adjusting-openings 13 enable the said brace-bars to be adjusted longitudinally to dispose the furrow-opener at any desired angle, as hereinbefore stated.

The covering shovels or plows 15 are secured to the rear ends of arms 16. The said arms are disposed between the brace-bars 11 and the laterally deflected or offset upper portions of the standard-arms 8 and have their front ends secured to the under sides of the frame 2, as at 17. The brace-bars 11, which are disposed on the inner sides of the coverer-arms 16, and the standard-arms 8, which are disposed on the outer sides thereof, effectually prevent lateral displacement of the coverer-arms in either direction, as will be understood. The said coverer-arms are springs, and hence adapt the covering-plows 15 to yield when they encounter fixed obstructions, such as stones or the like.

It will be understood that since the furrow-opener is disposed immediately in rear of the supporting-wheel 4 and the covering-shovels are disposed behind the furrow-opener, and since the seeds are dropped directly behind the furrow-opener in the furrow made thereby the operation of my improved attachments is efficient to secure the planting of the seeds in freshly-opened furrows in moist soil at an appropriate depth and the covering of the same in the said furrows, hence enabling the seeds to be planted appropriately in the ridges prepared for them and in such manner as to insure the germination of the seeds and the rapid development of the plants.

The furrow-opener and the covering attachments may be simultaneously lowered or raised by depressing or raising the handles 18. Hence the furrows may be opened to any desired depth and the seeds correspondingly deposited and covered therein.

At the front end of the frame 2 I provide a clearer 19, which is preferably of the form shown in Fig. 4 and has oppositely-extending arms 20, of suitable length to move stones, clods, and other obstructions out of the way of the supporting-wheel, furrow-opener, and coverers. The said clearer is carried by a suitable standard 21, which is secured to and depends from the front portion of the frame 2.

Having thus described my invention, I claim—

1. In a planter, the combination of a furrow-opener, standard-arms to which said furrow-opener is secured, the upper portions of said standard-arms being laterally offset, brace-bars in rear of the standard-arms and connected thereto and coverer-arms disposed between said brace-bars and the laterally-offset upper portions of the standard-arms, the latter and the coverer-arms being attached to the frame of the planter, substantially as described.

2. In a planter, the combination of a furrow-opener, standard-arms to which said furrow-opener is secured, the upper portions of said standard-arms being laterally offset and secured to the sides of the planter, brace-bars in rear of the standard-arms and secured to the lower ends thereof and to the planter, and spring coverer-arms having their front ends attached to the planter, the said spring coverer-arms being disposed between the brace-bars and the laterally-offset upper portions of the standard-arms, and thereby adapted to play vertically between them, the brace-bars and standard-arms preventing lateral displacement of the coverer-arms, substantially as described.

In testimony that I claim the foregoing as my own I have hereto affixed my signature in the presence of two witnesses.

WILLIAM A. HARPER.

Witnesses:
W. H. DARDEN,
J. M. BOWDEN.